Figure 8:
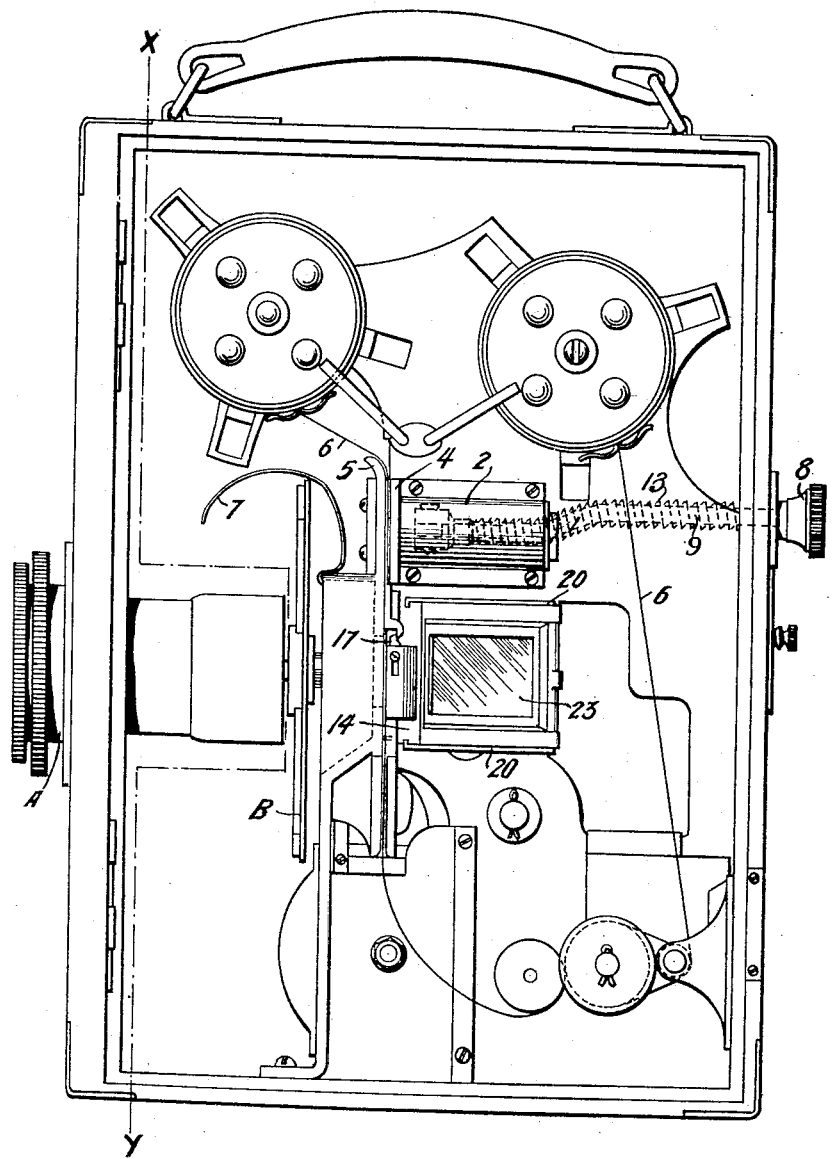

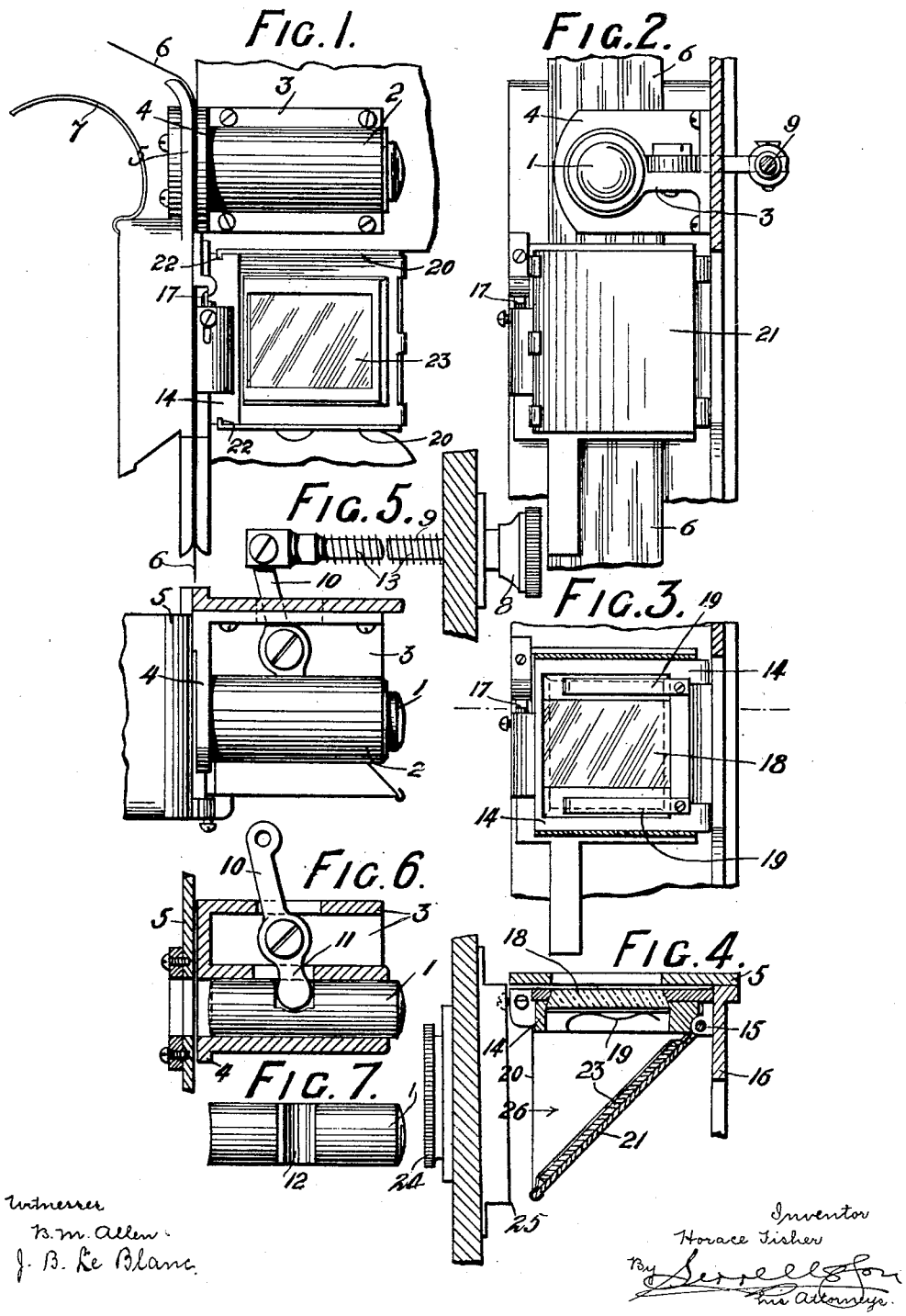

UNITED STATES PATENT OFFICE.

HORACE FISHER, OF LETCHWORTH, ENGLAND, ASSIGNOR TO WILLIAM EDWARD GARFORTH, OF PONTEFRACT, ENGLAND.

FILM-CAMERA.

1,129,564.  Specification of Letters Patent.  Patented Feb. 23, 1915.

Application filed June 6, 1914. Serial No. 843,379.

*To all whom it may concern:*

Be it known that I, HORACE FISHER, photographic-works manager, a subject of the King of Great Britain, residing at 12 Baldock road, Letchworth, Hertfordshire, England, have invented certain new and useful Improvements in Film-Cameras, and of which the following is a specification.

This invention relates to means for focusing the lens of a film camera during the time in which the film is in position.

In carrying the invention into effect, means are provided, such as a punch capable of mechanical operation from the exterior of the camera case, to form a perforation of the requisite size and shape through the film, such perforation taking place while the film is stationary and so that a further movement of the film will carry the perforated portion and bring the perforation therein in axial alinement with the camera lens between the front wall and a gate hereafter described.

The front wall is as usual formed with a through aperture by which the light rays passing through the lens reach the film, and the rear face of the film is supported against the wall by a hinged frame carrying a ground glass screen, and the frame carries an angular casing containing a mirror, which is thus held at the requisite angle to the axis of the lens to enable the reflection in the mirror of the picture projected on to the ground glass screen to be observed through a sight hole in one of the sides of the camera case, which sight hole is fitted with means by which it can be closed after the focusing operation has been completed.

An example of construction of the invention is shown in the accompanying drawings, in which—

Figure 1 is a left hand side elevation illustrating the punch and reflecting device. Fig. 2 is a rear elevation of the same. Fig. 3 is a sectional rear elevation of the reflecting device, and Fig. 4 is a horizontal section of the same. Fig. 5 shows in sectional plan the punch mechanism, Fig. 6 being a horizontal section showing the punch within its casing. Fig. 7 is an elevation of the punch removed from its casing and Fig. 8 is a left-hand side elevation of a film camera showing the present invention applied thereto.

Referring to the drawing, the punch 1, which may be cylindrical as shown, is contained in a barrel 2 formed with or fixed to a bracket 3 (Fig. 5) carried from the stationary framework of the mechanism in such a position that the forward face 4 of the punch framework is at a sufficient distance from the front wall 5 of the film passage to permit of the passage of the film 6 between the said front wall 5 and the forward face 4 of the punch casing, and the axis of the punch 1 is located above the axis of the lens A (Fig. 8) and parallel thereto. The front wall 5 aforesaid is perforated opposite the punch (see Fig. 6) to correspond therewith, and a forward screen 7 is fitted in front of the wall to prevent the pieces punched from the film 6 falling behind the camera shutter B as shown in Fig. 8. The punch is operated by pulling a knob 8 (Figs. 5 and 8) on the exterior of the case, which knob is connected to a rod 9, the forward end of which, in the interior of the case, is pivoted to one arm 10 (Fig. 5) of a two-armed lever. The two-armed lever is itself fulcrumed on the framework of the camera or preferably upon the punch casing as shown at Fig. 5, and the second arm 11 of the lever extends through the punch casing 2 and engages in a slot 12 of the punch 1, and a spring 13 is fitted on the operating rod 9 which brings and holds the punch in its rearward position. Thus it is only necessary to pull the knob 8 aforesaid and the punch is moved forwardly and produces a circular through aperture in the film, and then retires by the action of the spring before mentioned. Below the punch casing is situated a hinged frame 14, being hinged at 15 (Fig. 4) to the vertical portion 16 of the stationary framework so that it lies normally and approximately in surface contact with the front wall 5, so as to permit of the passage of the film 6 between the frame and the said front wall. The frame is formed with a suitable catch, such as a vertical spring bolt 17 (Fig. 1), adapted to engage a jaw on the front wall to hold it in its normal position.

The frame 14 (Figs. 3 and 4) carries in rabbets the ground glass 18, the rear face of which is acted upon by springs 19 fixed to the said framework, so as to hold the forward face of the glass 18 in light pressure contact with the rear face of the film.

The upper and lower edges of the frame 14 are grooved (Fig. 1) to form guides to receive the edges of the mirror frame. This frame is composed of upper and lower horizontal triangular plates 20 connected or formed with a vertical back plate 21, the forward edge of the triangular plates 20 being inturned at 22 (Fig. 1) to take into the grooves of the hinged frame 14 carrying the ground glass screen 18. The vertical wall of the mirror frame carries a mirror 23 which is thus, owing to the triangular shape of the upper and lower plates 20, located at the requisite angle to the axis of the lens as to show a reflection on the screen when viewed from the side of the camera case.

In the side of the camera case (Fig. 4) an aperture is formed closable by a metal cap 24 or other suitable device, and on the interior of the case around the perforation there is an inwardly extending screen 25 (Fig. 4) which shields the open face 26 of the mirror frame.

It will now be understood that, by operating the punch knob 8 on the exterior of the case, a perforation of large diameter is formed through the film 6, and by operating the mechanism the perforation will be carried into position coaxial with the axis of the camera lens A and arrive at such position at the time when the shutter B does not obstruct the lens; in this position the view projected on the ground glass screen 18 can be inspected through the aperture in the side of the camera case from which the cap 24 has been temporarily removed.

What I claim as my invention and desire to secure by Letters Patent is:—

1. In a camera, and in combination, a case, a lens, spaced walls providing a passage through which a film is intermittently fed past said lens, the said walls having apertures in axial alinement with the said lens, a punch, mechanism operable from the exterior of said case to actuate said punch and cause it to perforate said film at a part which has not reached said apertures, and a translucent screen in an aperture in said walls, upon which screen when the film has been moved so that the perforation therein registers with said screen, rays of light passing through said lens are projected and are seen through an aperture in a wall of the camera case, substantially as set forth.

2. In a camera, and in combination, a case, a lens, a rear and front wall within the case to provide a passage through which a film is intermittently fed past said lens, the said walls having apertures in axial alinement with the said lens, a cylindrical punch, means for supporting said punch at right angles to the face of said film and above said aperture in said front wall, reciprocatory mechanism operable from the exterior of said case to move said punch and cause it to punch a disk of film through an aperture in said front wall above aforesaid aperture and at a part of the film which has not reached the alining apertures in said front and rear walls, and a translucent screen in the aperture in said rear wall, upon which screen, when the film has been moved so that the perforation therein registers with said screen, rays of light passing through said lens are projected and are seen through an aperture in a wall of the camera case, substantially as set forth.

3. In a camera, and in combination, a case, a lens, a rear and front wall within the case to provide a passage through which a film is intermittently fed past said lens, the said walls having apertures in axial alinement with the said lens, a cylindrical punch, an open ended cylindrical guide for said punch carried at right angles to and in axial alinement with an upper aperture in said front wall said cylindrical guide being supported by a frame to which said front wall is fixed, a two-armed lever fulcrumed to said frame so as to be capable of oscillating in the direction of the axis of said punch one arm of said lever passing through a slot in the side of said cylindrical guide and engaging a recess in the side of said punch, a rod pivotally connected at one end to the other arm of said lever, the other end of said rod projecting through said camera case and adapted to be pulled outwardly to rock said lever and operate said punch and cause it to punch a disk of film through said upper aperture at a part of the film which has not reached the alining apertures in said front and rear walls, and a translucent screen in the aperture in said rear wall, upon which screen, when the film has been moved so that the perforation therein registers with said screen, rays of light passing through said lens are projected and are seen through an aperture in a wall of the camera case, substantially as set forth.

4. In a camera, and in combination, a case, a lens, a rear and front wall within the case to provide a passage through which a film is intermittently fed past said lens, the said walls having apertures in axial alinement with the said lens, a punch, mechanism operable from the exterior of said case to actuate said punch and cause it to perforate said film at a part which has not reached said apertures, a translucent screen in the aperture in said rear wall, upon which screen, when the film has been moved so that the perforation therein registers with said screen, rays of light passing through said lens are projected and are seen through an aperture in a wall of the camera case, and resilient means to hold the forward face of said screen in light pressure contact with the rear face of the film, substantially as set forth.

5. In a camera, and in combination, a case, a lens, a rear and front wall within the case to provide a passage through which a film is intermittently fed past said lens, the said walls having apertures in axial alinement with the said lens, a punch, mechanism operable from the exterior of said case to actuate said punch and cause it to perforate said film at a part which has not reached said aperture, a translucent screen in the aperture in said rear wall, upon which screen, when the film has been moved so that the perforation therein registers with said screen, rays of light passing through said lens are projected, and a mirror supported behind the screen and arranged at such an angle thereto as to reflect the view received by said mirror from said screen through an aperture in a side wall of said case, substantially as set forth.

6. In a camera, and in combination, a case, a lens, a rear and front wall within the case to provide a passage through which a film is intermittently fed past said lens, the said walls having apertures in axial alinement with the said lens, a cylindrical punch, means for supporting said punch at right angles to the face of said film and above said aperture in said front wall, reciprocatory mechanism operable from the exterior of said case to move said punch and cause it to punch a disk of film through an aperture in said front wall above aforesaid aperture and at a part of the film which has not reached the alining apertures in said front and rear walls, resilient means to normally retain said punch in its inoperative position, and a translucent screen in the aperture in said rear wall, upon which screen, when the film has been moved so that the perforation therein registers with said screen, rays of light passing through said lens are projected, and are seen through an aperture in a wall of the camera case, substantially as set forth.

7. In a camera, and in combination, a case, a lens, a rear and front wall within the case to provide a passage through which a film is intermittently fed past said lens, the said walls having apertures in axial alinement with the said lens, a cylindrical punch, an opend ended cylindrical guide for said punch carried at right angles to and in axial alinement with an upper aperture in said front wall, said cylindrical guide being supported by a frame to which said front wall is fixed, a two-armed lever fulcrumed to said frame so as to be capable of oscillating in the direction of the axis of said punch one arm of said lever passing through a slot in the side of said cylindrical guide and engaging a recess in the side of said punch, a rod pivotally connected at one end to the other arm of said lever, the other end of said rod projecting through said camera case and adapted to be pulled outwardly to rock said lever and operate said punch and cause it to punch a disk of film through said upper aperture at a part of the film which has not reached the alining apertures in said front and rear walls, a translucent screen in the aperture in said rear wall upon which screen, when the film has been moved so that the perforation therein registers with said screen, rays of light passing through said lens are projected, resilient means to hold the forward face of said screen in light pressure contact with the rear face of the film, and a mirror supported behind said screen and arranged at such an angle thereto as to reflect the view received by said mirror from said screen through an aperture in a side wall of said case, substantially as and for the purpose set forth.

In witness whereof I have hereunto set my hand in the presence of two witnesses.

HORACE FISHER.

Witnesses:
 GRIFFITH BREWER,
 WILLIAM A. MARSHALL.

Copies of this patent may be obtained for five cents each, by addressing the "Commissioner of Patents, Washington, D. C."